Dec. 29, 1970   P. J. L. SEQUEIRA ET AL   3,551,112
MULTIPLE PIPETTING APPARATUS
Original Filed July 24, 967   11 Sheets-Sheet 7

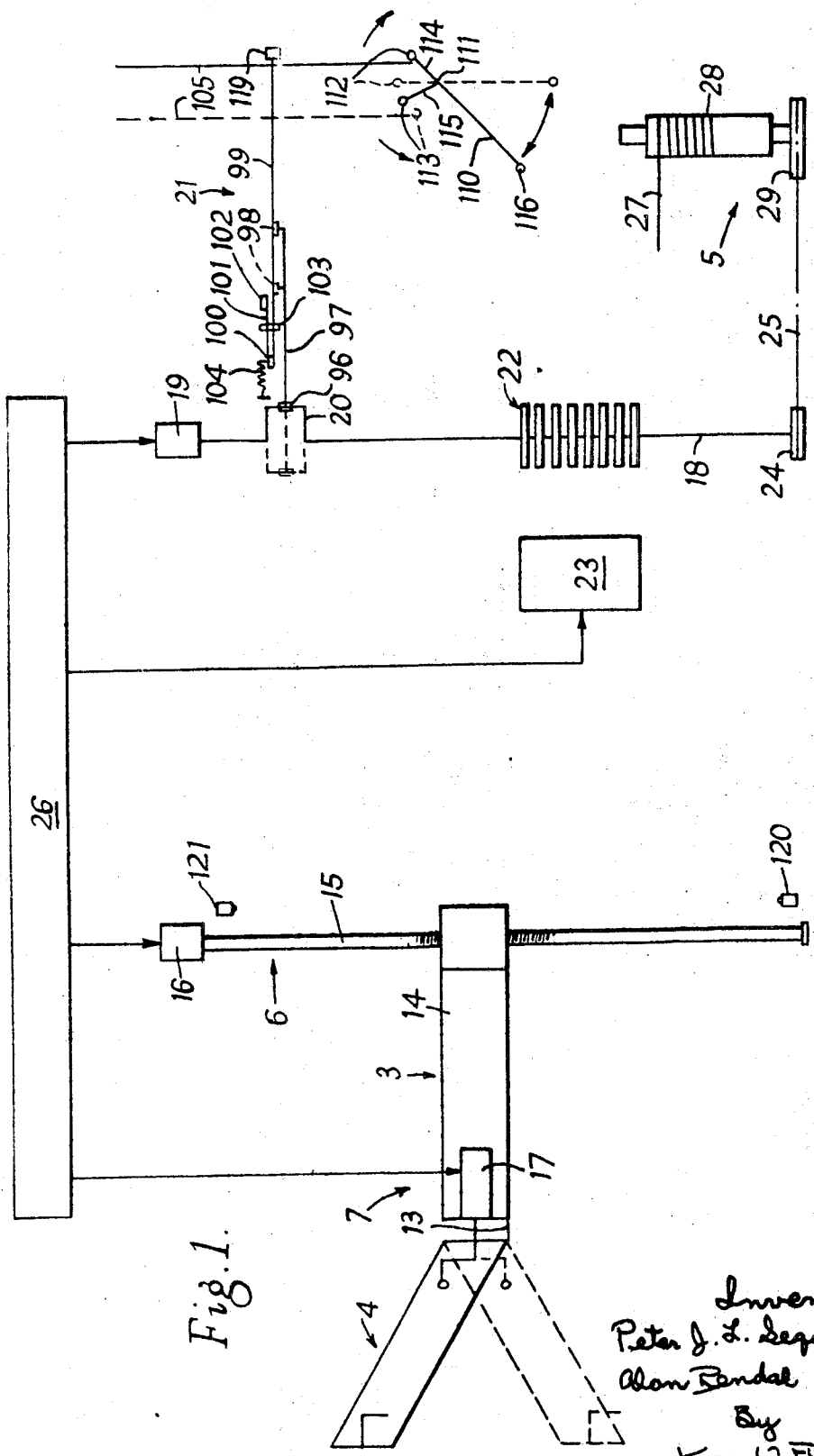

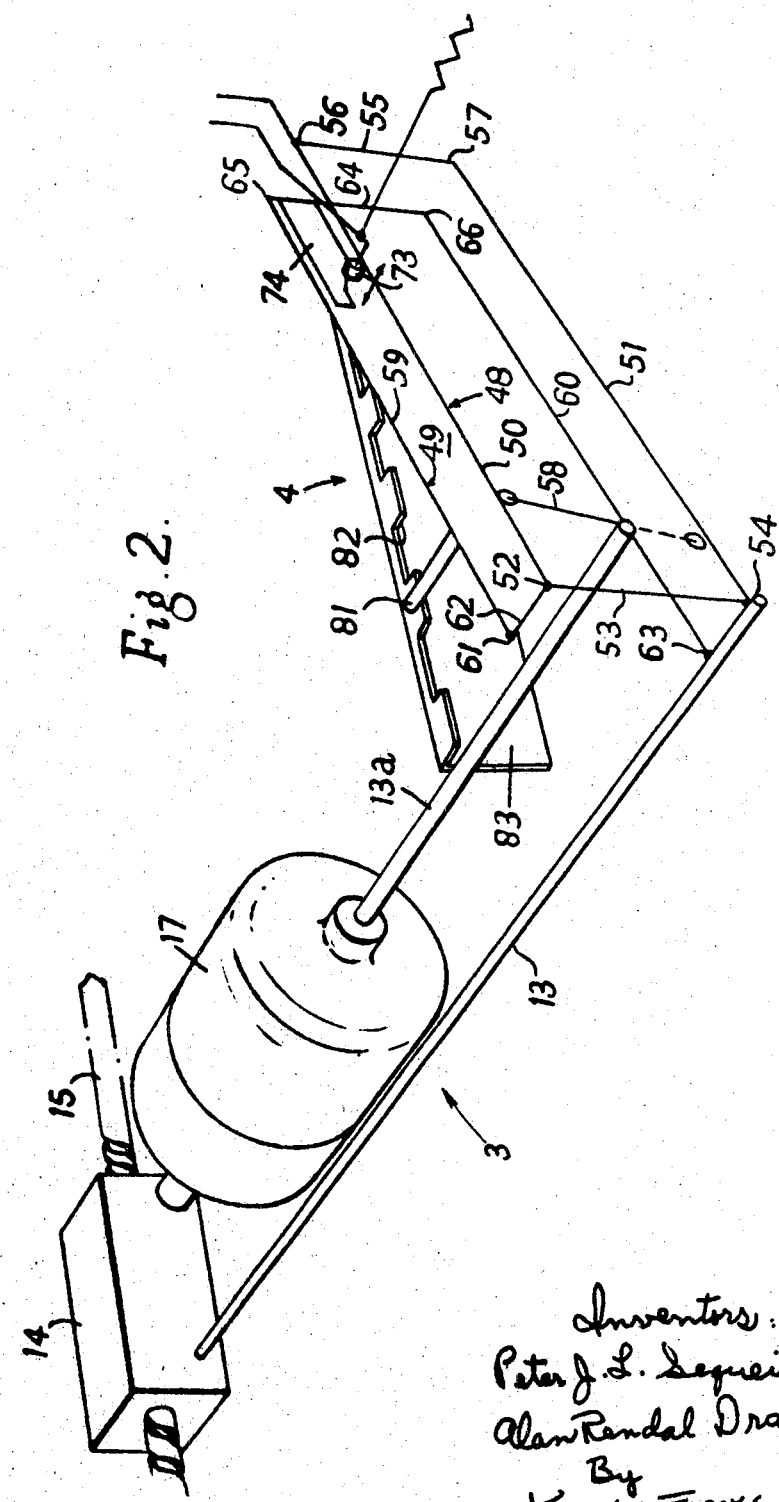

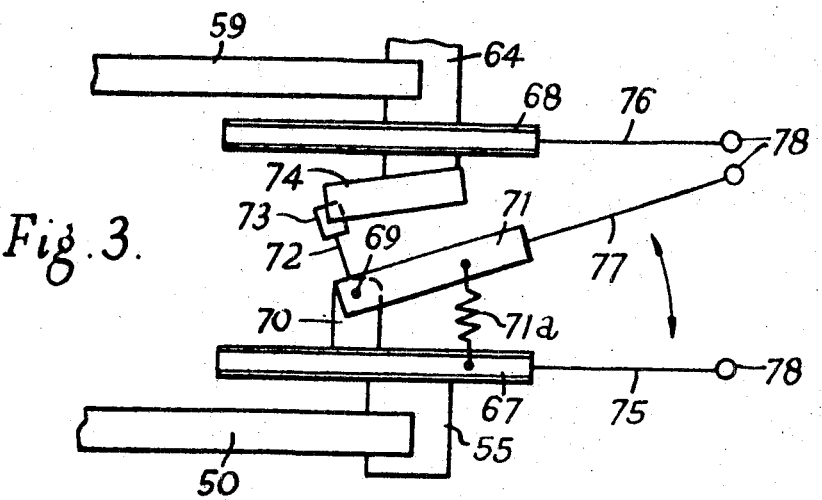

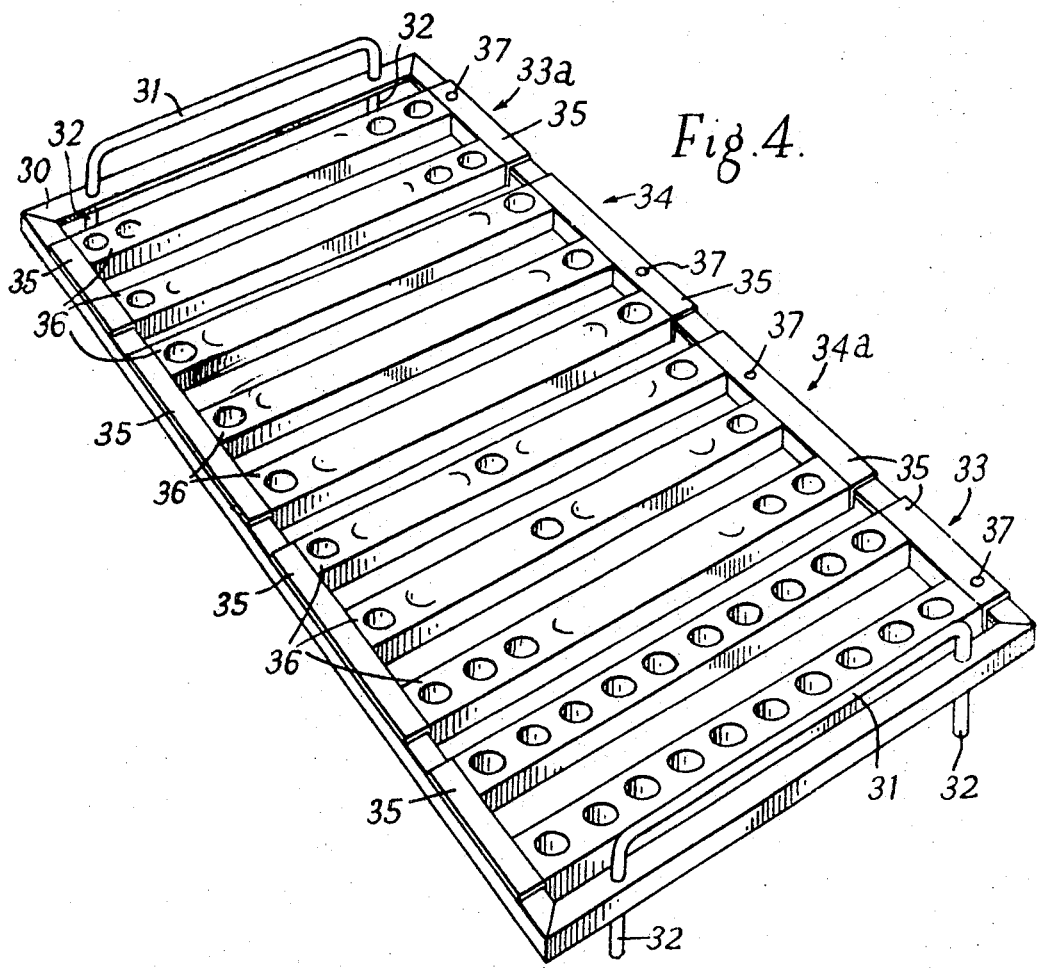

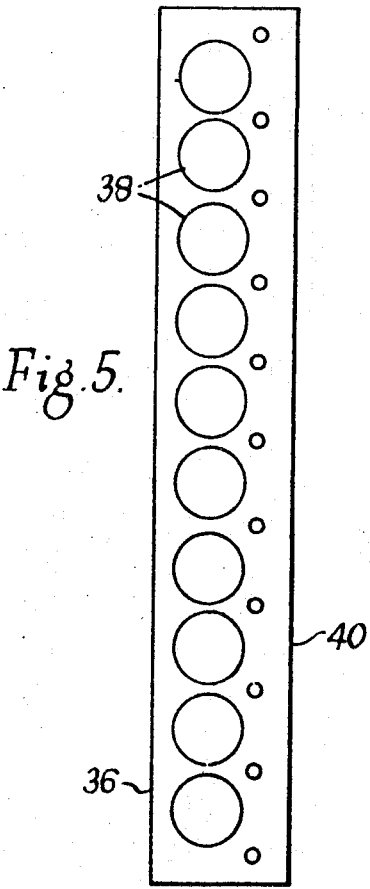
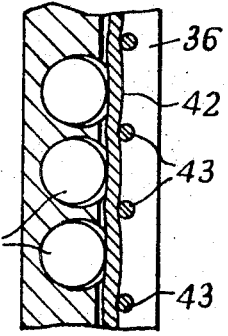
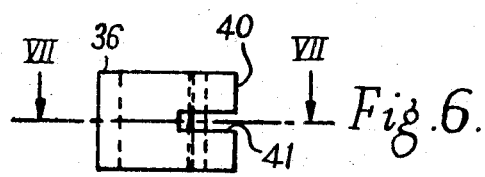

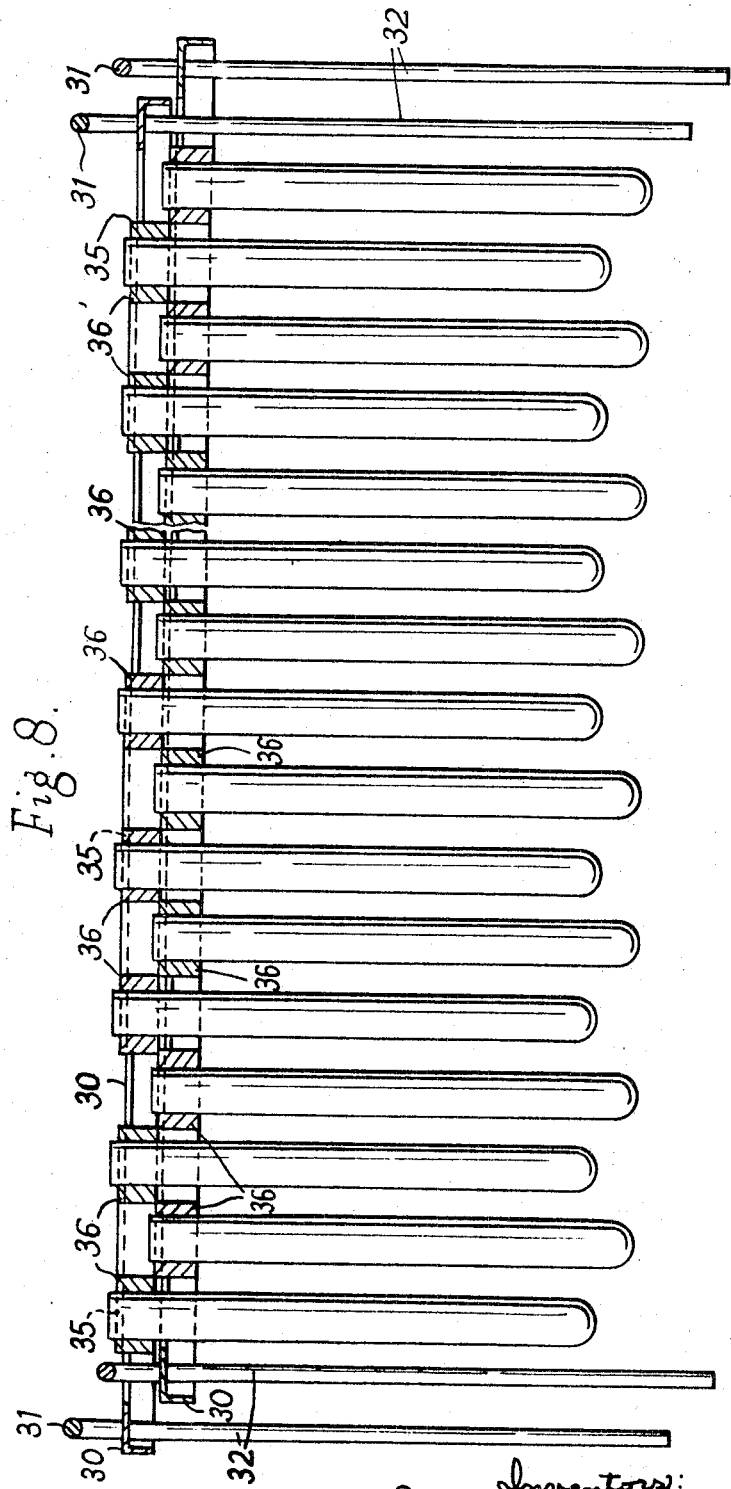

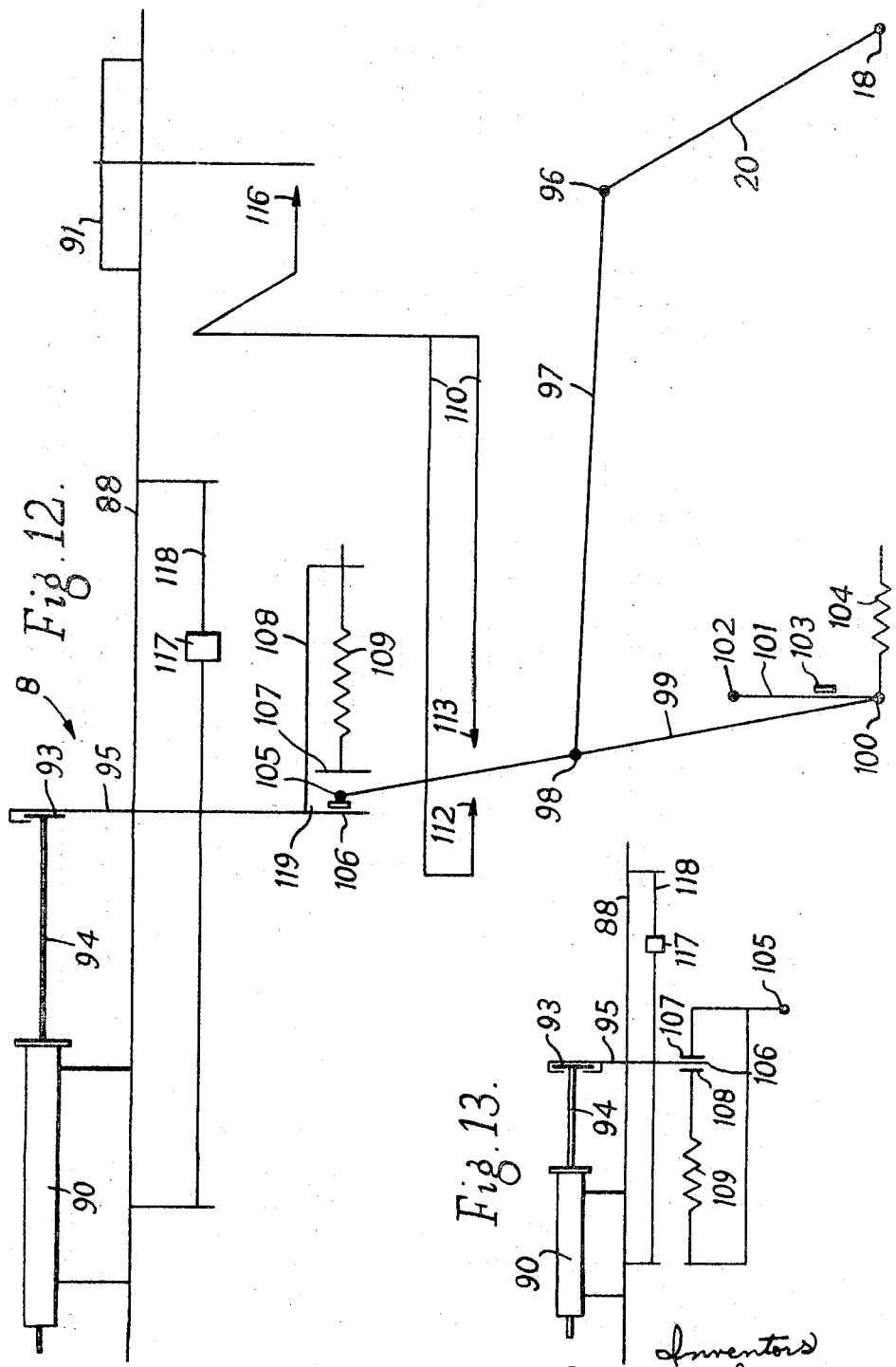

Dec. 29, 1970   P. J. L. SEQUEIRA ET AL   3,551,112
MULTIPLE PIPETTING APPARATUS
Original Filed July 24, 1967   11 Sheets-Sheet 11

United States Patent Office 3,551,112
Patented Dec. 29, 1970

3,551,112
MULTIPLE PIPETTING APPARATUS
Peter J. L. Sequeira, Wilmslow, and Alan Rendal Drake, Theydon Bois, England, assignors to Baird and Tatlock (London) Limited, Chadwell Heath, Essex, England, a company of Great Britain
Continuation of application Ser. No. 655,442, July 24, 1967. This application Nov. 3, 1969, Ser. No. 871,609
Claims priority, application Great Britain, July 23, 1966, 33,226/66
Int. Cl. B01l 3/02; G01n 1/00, 1/14
U.S. Cl. 23—259
22 Claims

ABSTRACT OF THE DISCLOSURE

Multiple pipetting apparatus whereby successive treatment operations may be carried out on a plurality of liquid samples in individual receptacles. The apparatus may comprise a carriage for supporting a plurality of receptacles a positioning mechanism and nozzle support moveable relative to the carriage and a measuring device operable to extract liquid from or dispense liquid into predetermined receptacles via nozzles in the support.

---

This application is a continuation of application Ser. No. 655,442, filed July 24, 1967, now abandoned.

BACKGROUND OF THE INVENTION

In laboratory work and particularly for the treatment of clinical samples in hospitals it is often necessary to deal with a large number of samples as quickly as possible. The treatment envisaged may form part of an analysis operation and may for example involve one or more of the following procedures.

(1) The extraction of a measured volume of a sample (or of a reaction mixture derived therefrom) from a first receptacle and dispensing this measured volume into a second receptacle. Subsequently or simultaneously a measured volume of at least one other substance such as a reagent or a diluent may be added to the second receptacle.

(2) The addition of a predetermined quantity of one or more reagents to a sample (or a reaction mixture incorporating the sample) already in a receptacle.

(3) The extraction of a reaction mixture from a receptacle and its assessment by means of an instrument such as a photometer.

(4) The use of second or control samples for any of the above operations which control samples are to be subjected to a different treatment operation for checking purposes.

(5) The provision of sample holders that may conveniently be subdivided and moved bodily to another treatment apparatus such as for example a centrifuge whilst retaining ready identification of individual samples and also substantial symmetry irrespective of the exact number of samples to be treated if this number is less than the maximum possible in the holders.

In the past fraction collecting and reagent dispensing apparatus has been proposed with which some of the above mentioned treatment operations can be carried out successively on large numbers of samples, the latter being disposed in a rectangular array of racks; in a circular array; or in a belt system moveable past the treatment location. However, previously proposed apparatus has been inflexible in operation with the requirement that at least part of any other treatment process which it is desired to carry out needs to be effected manually. Manual treatment requires the use of highly skilled personnel, is particularly slow in operation so it is inappropriate where a large number of samples are to be treated.

SUMMARY OF THE INVENTION

It is accordingly an object of the present invention to provide improved multiple pipetting apparatus which is particularly flexible in operation and readily enables a variety of patterns of treatment operation to be performed.

A further object of the present invention is to provide such apparatus incorporating improved positioning mechanism for carrying a plurality of nozzles for co-operating with an array of test tubes or other receptacles.

Yet another object of the present invention is to provide such an apparatus with improved liquid extraction and dispensing mechanism which includes readily replaceable units to facilitate programme changes.

An additional object of the present invention is to provide such apparatus with an improved receptacle rack system.

According to one aspect of the present invention there is provided multiple pipetting apparatus comprising a carriage for supporting in a generally rectangular array a plurality of receptacles, a positioning mechanism comprising a nozzle support drive means to move the carriage and the positioning means linearly in directions at an acute angle to one another and to provide translational movement of the nozzle support from a position in which a nozzle carried thereby is above one receptacle to a position in which said nozzle is above another receptacle and movement of the nozzle support while said nozzle is in register with predetermined receptacles between an upper position in which the nozzle is spaced above the receptacle and a lower position in which the nozzle extends into the receptacle and a measuring device operable to extract liquid from or dispense liquid into predetermined receptacles only when the nozzle support is in its lower position.

Preferably the carriage is continuously moveable and the positioning mechanism is traversable step by step.

BRIEF DESCRIPTION OF THE DRAWINGS

The above and other aspects of the present invention will now be described by way of example with reference to the accompanying drawings in which:

FIG. 1 shows in diagrammatic form the essential features of a multiple pipette apparatus according to the invention, FIG. 2 shows diagrammatically in perspective positioning mechanism, FIGS. 3 and 3a respectively show details of nozzle support positions, FIG. 4 shows in perspective a receptacle tray incorporating test tube racks, FIGS. 5 and 6 show respectively plan and side elevational views of part of the receptacle holder, FIG. 7 is a section on the line VII—VII of FIG. 6, FIG. 8 shows in longitudinal section two of the trays of FIG. 4 interleaved with one another, FIG. 12 shows a detailed arrangement of the measuring device, FIG. 13 shows a modification to part of the measuring device and FIG. 14 diagrammatically a perspective view of the apparatus in its casing.

DESCRIPTION OF THE PREFERRED EMBODIMENTS

Figure 14:
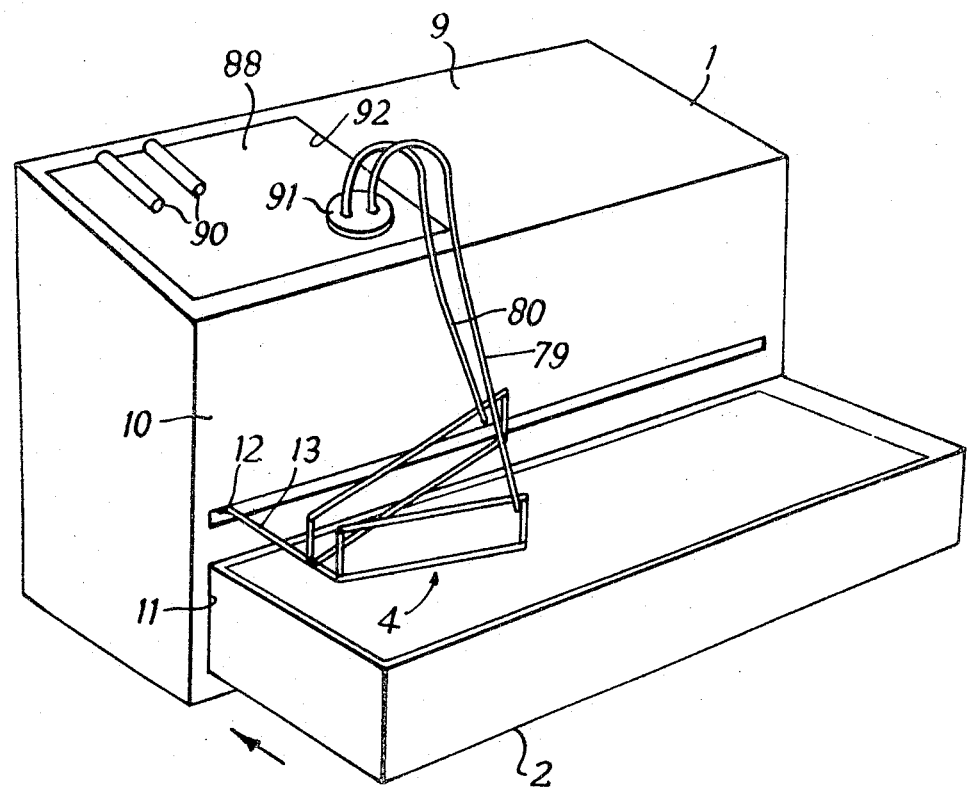

Referring to FIGS. 1, 12 and 14, the apparatus is incorporated in a casing 1 and comprises a carriage 2 constituting a water bath, a positioning mechanism indicated generally at 3 and incorporating a nozzle support indicated generally at 4; drive means indicated generally at 5, 6 and 7 respectively for the carriage, the positioning means and the nozzle support; measuring device indicated generally at 8 and means for controlling and correlating the operation of these generally indicated parts.

The casing 1 is generally rectangular in shape with a sloping upper surface 9 and a front wall 10 formed with a rectangular aperture 11 in the lower part thereof to receive with clearance the carriage 2. The latter is mounted on suitable extensible tracks (not shown) to be moveable linearly into and out of the casing 1 under the control of its drive mechanism 5 as will be explained hereinafter. Above the opening 11 the front wall 10 is formed with a slot 12 to receive with clearance a support 13 for the nozzle support 4. This shaft is supported internally of the casing 1 by a carriage drive nut 14 running on a lead screw 15, driven by a motor 16 and forming part of the drive means indicated generally at 6. The nut 14 supports a motor 17 for the nozzle support 4.

The lead screw 15 is disposed generally longitudinally within the casing 1 but is inclined at an acute angle to the direction of movement of the carriage 2 as will be explained hereinafter.

The casing 1 also incorporates a drive shaft 18 driven by a motor 19. The shaft 18 is formed with a crank 20 for driving mechanism indicated generally at 21 controlling operation of the measuring device 8. The shaft 18 also carries a series of cams indicated diagrammatically at 22 to control operation of a corresponding series of micro switches indicated generally at 23 and a two speed gear box 24 coupled by a chain drive 25 with the carriage drive means 5.

Operation of the motors 16, 17 and 19 is controlled in appropriate sequential order by a timing control 26 which is itself partially controlled by the micro switches 23.

The carriage 2 as mentioned above comprises a water bath for the receipt of the receptacles such as test tubes in a generally rectangular array. The carriage is provided with thermostatically controlled water circulating and heating apparatus (not shown) and is coupled with a drive wire 27 wound around a drum 28 forming part of the carriage drive means 5 and coupled with a sprocket 29 engaged by a chain 25. It will be understood that with the carriage in its outermost position energisation of the motor 19 causes rotation of the shaft 18 and the drum 28 in the sense to wind the wire 27 thereon so that the carriage is moved linearly inwardly at the casing 1 at a steady speed. If desired friction means (not shown) may be incorporated in the carriage tracks and inward movement of the carriage may be against the action of a return spring (not shown).

The carriage 2 is arranged to accommodate receptacles in the form of test tubes in two nesting trays each tray having two pairs of nestable racks. FIG. 4 shows a single tray comprising a rectangular tray frame 30 provided with handles 31 at each end; these handles having downwardly depending legs 32. The tray frame 30 carries towards its outer end a pair of two-row test tube racks 33 and 33a and intermediate these a pair of three-row racks 34 and 34a. Each of the racks comprises a pair of end supports 35 of generally L-shape connected by bars 36. The racks are held by the supports 35 engaging between opposed longitudinal parts of the tray frame 30 as shown in FIG. 4. A corresponding one of the supports of each of the racks has locating means 37 for cooperating with the tray frame to locate the racks thereon as shown in FIG. 4 with each of the end racks 33 and 33a being spaced from the end of the tray frame and each rack being spaced from its adjoining rack. It is to be noted that the locating means 37 for the racks 33 and 33a occur opposite the outermost bar of these racks whereas the locating means 37 for the racks 34 and 34a are respectively located between those pairs of bars 36 nearest the centre of the tray frame 30.

As shown in FIGS. 5, 6 and 7 each of the bars 36 comprises ten apertures 38 extending from their upper to the lower faces to receive with clearance test tubes 39 as shown in FIG. 7. One end face 40 of each bar is formed with a longitudinal slot 41 opening into each of the apertures 38. A length of coil spring wire 42 is located in the base of the slot 41 and extends partially through each aperture 38 being maintained in position by pegs 43 disposed at each end of the bar and between each of the apertures. It will be understood that with this arrangement test tubes having a small range of external diameters may be accommodated in the apertures 38 and accurately located firmly against the walls of these apertures opposite the positions of the spring wires 42. In practice the racks are located in the tray frames with their bars all oriented to have the spring wire 42 on the same side thereof.

FIG. 8 shows how two tray frames 30 may be nested one within another so that one pair of legs 32 of the uppermost tray and one of the handles 31 of the lowermost tray respectively extend through gaps between an end part of the tray frame and the endmost racks of the other tray while the test tubes 39 of the uppermost tray extend through the gaps between the bars 36 of the lowermost tray.

The arrangement of tray frames and racks above described ensures that each test tube is separately held towards its upper end in an accurately located position relative to the other test tubes in the array; permits test tubes of varying length to be employed; resists any tendency for the tubes to float in the water bath and by leaving the major part of the tube unobstructed ensures that good circulation of water in the water bath can be achieved to maintain the contents of the tubes at the desired temperature; facilitates nesting of the tubes and also enables the tubes to receive adequate support at their side and lower ends against high g forces when the racks are transferred bodily to a centrifuge carrier as will now be described.

Figure 9:
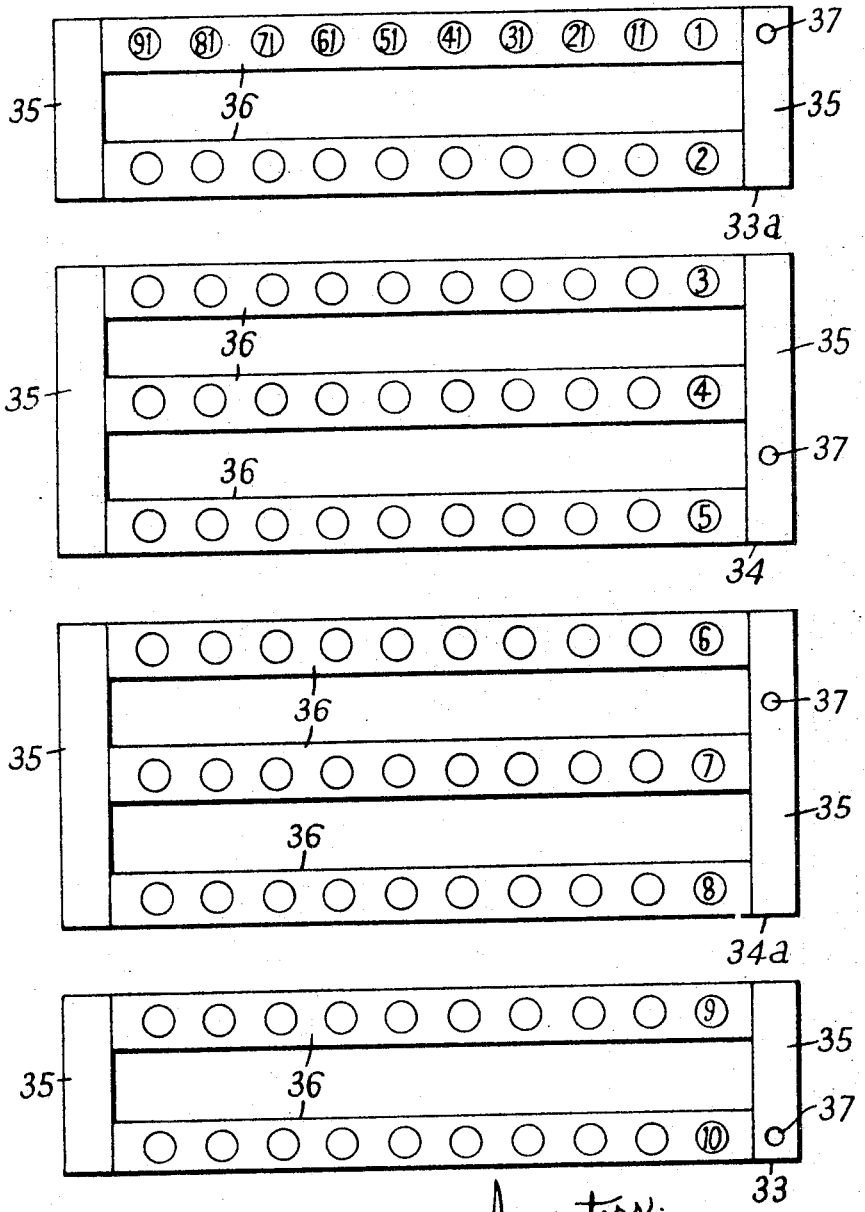
FIG. 9 shows in plan the racks of FIG. 4.
Figure 10:
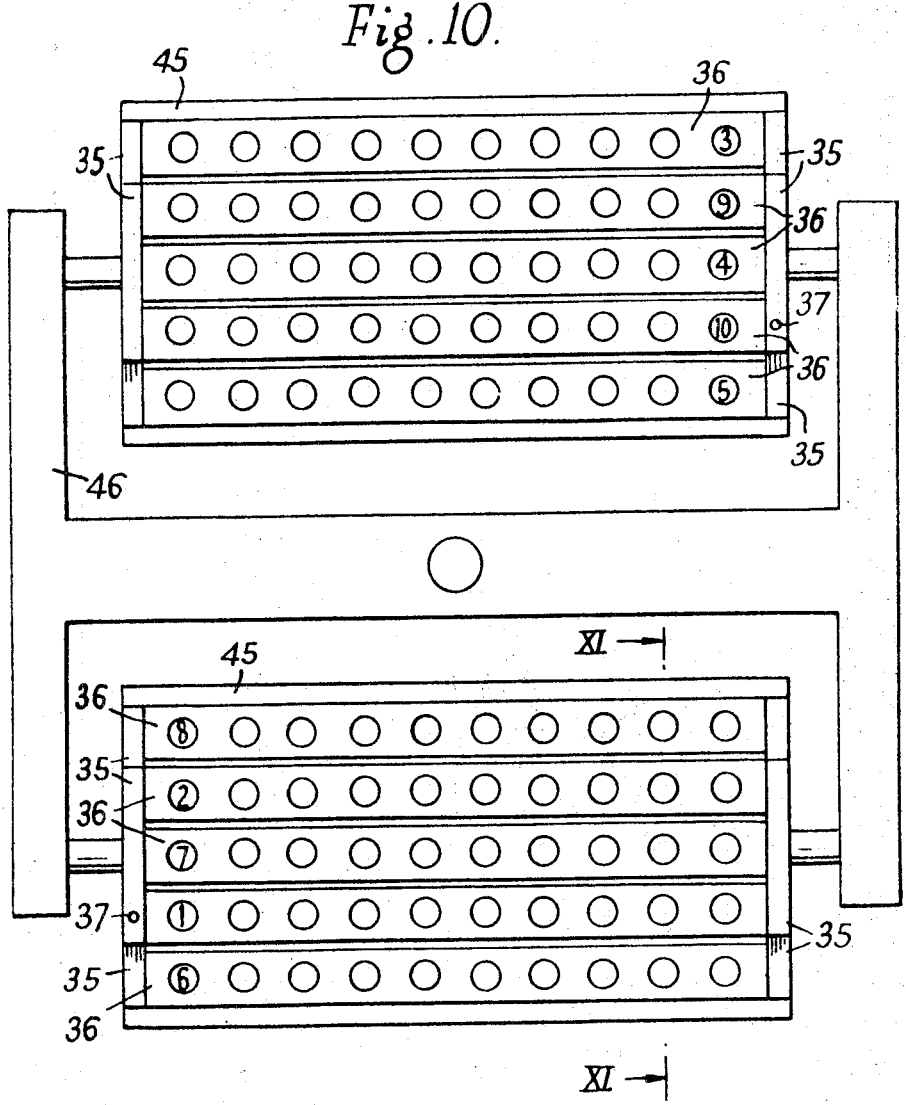
FIG. 10 shows in plan the racks of FIG. 9 mounted in a centrifuge.
Figure 11:
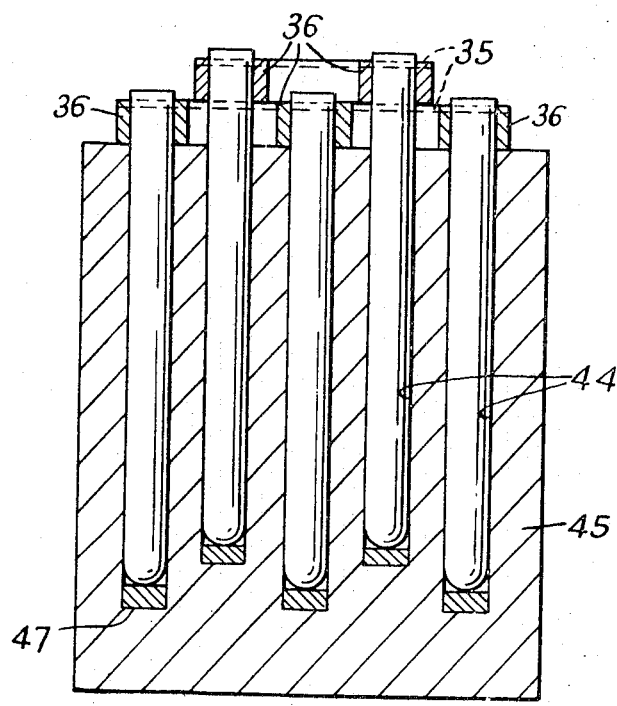
FIG. 11 is a section on the line XI—XI of FIG. 10.

Referring to FIG. 9 this shows in plan view the racks of the tray of FIG. 4 and indicates the manner in which the apertures 38 may be considered to be numbered 1–100. If it is desired to centrifuge the tubes within these racks this may most conveniently be done by first taking the rack 33 and nesting it over the rack 34 with the locating means 37 of these racks engaging one another so that the test tubes carried by the bars 36 of the rack 33 are disposed between the bars 36 of the rack 34. Similarly the rack 33a is nested with the rack 34a. One pair of nested racks is then turned through 180° with respect to the other and the tubes carried by these racks are disposed within suitable apertures 44 of carrier blocks 45 of a centrifuge head 46. The numbering of the apertures 38 in FIG. 10 to correspond with the numbers in FIG. 9 shows the manner in which the racks are nested in pairs and oriented with respect of each other. This arrangement ensures that the centrifuge head is never in imbalance by more than two tubes irrespective of the actual number of tubes in the array. FIG. 11 shows in cross section a pair of nested racks with the tubes 39 fitting closely into the apertures 44 the lower parts of which are provided with resilient pads 47.

It will be understood that so long as the racks from a particular tray are retained together or are identifiable as belonging to that tray they cannot be redisposed in the tray frame with the apertures 38 other than in the correct sequential order so that the numbering of the tubes in the array is preserved.

Thus the carrier 2 of the apparatus may accommodate two nested trays of tubes each tray containing a hundred tubes and in rows extending longitudinally of the trays (i.e. transverse of the movement of the carriage 2) the tubes of one tray alternate with the tubes of the other tray.

The positioning mechanism 3 of the nozzle support 4 is shown most clearly in FIGS. 2, 3 and 3a of the drawings.

As shown in FIG. 2 for the sake of clarity the support 13 for the nozzle support 3 is separated from the drive shaft 13a of the motor 17 but in practice the support 13 would be tubular with the shaft 13a extending through it. The nozzle support 4 comprises first and second frames 48 and 49 of generally parallelogram formation the frame 48 comprising parallel upper and lower bars 50 and 51 respectively pivoted at 52 at the upper end of a fixed vertical link 53 carried by the support 13 and at 54 to the support 13. The outer ends of the bars 50 and 51 are bridged by a vertical link 55 pivoted to the bars at 56 and 57. It will be understood that rotation of the motor shaft 13a through a notional link 58 coupled with the frame 48 causes the latter to oscillate about the pivots 52 and 54 whilst the bars 50 and 51 remain parallel with one another and the links 53 and 55 remain vertical. The second frame 49 comprises upper and lower bars 59 and 60 respectively pivoted at 61 at one end of an arm 62 supported from the pivot 52 and at 63 on the support 13 the outer end of the bars 59 and 60 being bridged by a vertical link 64 pivoted thereto at 65 and 66.

The links 55 and 64 have respectively rigidly secured thereto nozzle carrying arms 67 and 68 (shown in FIG. 3) the arm 67 having pivoted at 69 to an extension 70 thereof an auxiliary arm 71 carrying a spindle 72 provided with a roller 73 to cooperate with the inclined undersurface of a plate 74 carried by the arm 68. The arm 71 is urged in a clockwise direction in FIG. 3 by a spring 71a. The outer ends of the arms 67 and 68 are arranged to be capable of supporting resilient extensions indicated at 75 and 76 and the arms 71 may similarly support a resilient extension 77 the outer ends of these extensions being formed with spring wire loops 78 to receive nozzles comprising the lower ends of plastic tubes two of which are shown at 79 and 80 in FIG. 14.

Returning now to FIG. 2 of the drawings the second frame 49 carries a bar 81 engageable in the castellated edge 82 of a fixed member 83.

In operation of the nozzle support rotation of the motor shaft 13a causes the first frame 48 to "dip" or move from its upper to its lower position and if at this time the bar 79 engages a tongue on the castellated edge 82 the second frame 49 remains in its upper position and as the first frame 48 moves towards its lower position the spring 71a urges the auxiliary arm to a position alongside the arm 67 so that nozzles carried by the extensions 75 and 77 lie alongside one another and may extend into the same test tube in the interleaved trays disposed in the carriage 2. Should however the bar 81 at this time register with a recess in the edge 82 the second frame 49 will be carried downwardly with the first frame 48 the inclined lower surface of the plate 74 resting on the roller 73 so urging the auxiliary arm 71, against the action of its spring 71a towards the arm 68 so that a nozzle carried by the resilient extension 77 will be displaced one tube pitch behind one carried by the resilient extension 76 and will "dip" into the same test tube.

FIG. 3a shows another pair of nozzle-carrying arms 84 and 85 to be mechanically linked and to be pivotable with the second frame 49 these further nozzle-carrying arms being capable of supporting resilient extensions 86 and 87 for further nozzles to cooperate with adjacent rows of tubes in the array.

Nozzles such 79 and 80 may be positioned in the nozzle carrier 4 according to the operation required to be performed, for example as follows:

(a) For a single transfer from a tube in one tray to the adjoining tube in the same row of the other tray a single nozzle could be positioned in the extension 75.
(b) When it is desired to operate on every other tube in a row for the addition of a reagent to a single tube or for the extraction of liquid from a single tube for transfer to another instrument, a single nozzle can be carried by the extension nozzle 76.
(c) For a double transfer of liquid from one tube to be dispensed into two tubes, nozzles can be disposed in the extension 75 and 77.
(d) For the operation in (b) above to be effected in two rows nozzles could be carried by the extensions 86 and 87.
(e) For two consecutive operations any appropriate combination of (a–d) above.

It will here be understood that when the auxiliary arm 71 pivots towards the arm 68 a nozzle carried by the extension 77 is displaced by one tube pitch from the nozzle carried by the extension 75.

The measuring device 8 (FIG. 12) comprises a replacement base board unit 88 carrying a plurality of syringes 90 two of which are shown diagrammatically in FIG. 14 and one of which is shown in FIG. 12 together with a valve 91 which is a rotatable slide valve offering a separate single pole changeover facility for at least some of the syringes 90. The valve permits those syringes connected thereto to be separately connected either with associated nozzles such as 79 and 80 or externally of the apparatus (not shown) for example to reagent reservoirs or other associated test equipment to which samples are to be delivered. Two syringes may, of course, be connected through one pole of the valve.

The base plate 88 fits in suitable supports (not shown) within an aperture 92 in the upper surface 9 of the casing 1 with the head 93 of each syringe piston rod 94 engaging with a separate drive member 95 therefor, the member 95 being associated with the driving mechanism 21 (FIG. 1).

Referring to FIGS. 1 and 12 the crank 20 has one end 96 of a connecting rod 97 pivoted thereto, the other end of the rod 97 being pivoted at 98 intermediate the length of an arm 99 pivoted at 100 to link 101 extending generally alongside part of the arm 99 and pivoted to a fixed point 102. The link 101 and the arm 99 are urged against the stop 103 by a spring 104. At its other end the arm 99 carries a bar 105 extending transversely beneath the base plate 88 to engage between spaced apart jaws formed respectively by the lower end 106 of the drive member 95 and a pad 107 supported from an extension 108 from the drive member 95 with the intermediary of a compression spring 109.

It will be understood that each of the syringes 90 is provided with a drive member 95 and the jaw mechanism discussed above which is carried by the base plate 88 and when the syringes are all empty are accurately aligned so as to engage over the bar 105.

A bell crank lever 110 is pivoted at 111 and has the outer ends 112 and 113 of the arms 114 and 115 disposed in the path of part of the bar 105 to be engaged thereby as the latter is reciprocated and towards the end of each stroke thereof. The end 116 of the other arm of the bell crank lever constitutes an operating member for the valve 91 (FIG. 12).

Each of the syringes 90 has associated with it and disposed beneath the base plate a stop 117 moveable along a support 118 and capable of being fixed in any desired position along this support to be in the path of movement of its associated arm 95.

As the shaft 18 rotates through one revolution, the connecting rod 97 commences to move the bar 105 about the pivot 100 in a clockwise direction as shown in FIG. 12. In this figure it is to be assumed that the syringe 90 is empty and its piston is in the fully closed position. The bar 105 engages the pad 107 and without compressing the spring 109 it drives each syringe piston via its associated drive member 95, head 93 and piston rod 94 to the right as viewed in FIG. 12 so filling the syringes 90 (either from a receptacle in the carriage 2 or from a reservoir externally of the apparatus) until each drive member 95 engages its associated stop 117 previously set with the required syringe volume. Thereafter further movement of the bar 105 in the same direction compresses the spring 109 carried by the drive member 95 while the latter is engaged with its stop so allowing the bar 105 to complete its stroke. The mechanism is arranged so that the stops 117 for all the syringes are always reached before the bar 105 completes its stroke so as to ensure that the arm 99 engages the outer end 113 of the arm 115 of the bell crank lever 110 to operate the valve 91 so as to reconnect the syringes appropriately prior to discharge of liquid therefrom during the second half cycle of the crank 20 (i.e. the opposite stroke of the bar 105). When the bar 105 moves counter clockwise as viewed in FIG. 12 its engagement with the lower ends 106 of the member 95 causes the syringes to dispense until the bar 105 engages with a stop 119 at which time the arm 99 pivots about the bar 105, the strength of the spring 104 is overcome so that the link 101 is pivoted about 102, and engagement of the arm 99 with the outer end 112 of the arm 114 of the bell crank lever 110 effects another changeover of the valve 91 preparatory to commencement of another operating cycle.

Thus in each half cycle of operation of the mechanism 21 two lost motion devices are operable; firstly the springs 109 each enabling the associated syringe on the base plate 88 to be set to different volumes and secondly the spring and link mechanism 104 and 101 which enables movement of the arm 99 to be continued beyond the fully closed positions of the syringes in order to effect changeover of the valve 91.

It will be understood that the micro switches 23 operated by the cams 22 carried by the shaft 18 serve through the timing control 96 to correlate operation of the motors 16, 17 and 19.

For example with the positioning mechanism at the upper end of the lead screw 15 as viewed in FIG. 1 the motor 17 may be energised by one of the micro switches 23 acting through the control, 26 to move the nozzle support 4 to its lowermost position. A micro switch (not shown) operated by a cam on the shaft 13a of the motor 17 via the timing control 26 de-energises the motor 17 with the nozzle support in its lowermost position. In this position as explained above and depending upon the particular pattern of nozzle dispositions chosen so nozzles can be extending within one or several tubes in the trays disposed in the carriage 2. After an appropriate delay determined by the control 26 the motor 19 is energised so as to operate the syringes as described above during the first half revolution of the crank 20. Near the end of this first half revolution a micro switch operated by one of the cams 12 via the control 26 energises the motor 17 to lift the nozzle support to its uppermost position. Another micro switch 22 then causes energisation of the motor 16 to drive the lead screw 15 so traversing the positioning mechanism 3 through a distance equal to one tube pitch. The lead screw 15 may carry a cam (not shown) for operating a further micro switch to de-energise the motor 16 and stop the mechanism in the appropriate position. Another of the micro switches operated by the cams 22 then energises the motor 17 to lower the nozzle support as before and at this time the bar 105 is just beginning its second stroke (i.e. at the commencement of the second half revolution of the crank 20) for liquid in the syringes to be dispensed. When the bar 105 reaches the stop 119 at the end of this second stroke a further micro switch on the cam 22 is operated to energise the motor 17 to lift the nozzle support as before and another of the cams 22 operates a further micro switch to energise the motor 16 to rotate the lead screw 15 as before.

Throughout this time the drum 28 has been steadily driven from the shaft 18 via a chain 25 so moving the carriage 2 inwardly of the apparatus. It will here be understood that this steady move is possible as a result of the inclination at an acute angle of the lead screw 15 to the direction of movement of the carriage.

The cycle described above is performed ten times and at the end of the tenth cycle a micro switch 120 towards the end of the lead screw 115 is operated by the nut 14 so that via the control 26 the motor 19 is de-energised but the motor 16 is reversed and arranged to operate at a higher speed to return the positioning mechanism to the other end of the lead screw until the nut engages with a further micro switch 121 which via the control 26 de-energises the motor 16 and energises the motor 19 ready for the first cycle of operation on the next row of tubes.

When two rows of tubes in the carriage are to be processed simultaneously (using a technique involving specimen blanks) the ratio of the two speed gear box 24 is doubled so doubling the speed of movement of the carriage 2. The angle between the lead screw 15 and the direction of movement of the carriage 2 is also changed so that nozzles carried by the nozzle support 4 move over two rows of tubes as the nozzle support 3 moves from one end of the lead screw 15 to the other.

FIG. 13 shows a modified operating mechanism for the syringes 90 and in this arrangement the lower end 106 of the drive member 95 engages between jaws constituted by a first pad 107 also supported by bar 105 but with intermediary of the spring 109.

This arrangement is preferred to that disclosed in FIG. 12 as it reduces the number of parts required but it will be understood that its mode of operation is effectively the same.

Although as described above with reference particularly to FIG. 3 of the drawings the nozzles are supported beyond the end of the frames 48 and 49 it will be understood that the resilient extensions can be secured to the other ends of the arms 67 and 68, 71, 84 and 85 so as to project back towards the support 13.

It will also be understood that although as described above three motors 16, 17 and 19 have been used it would be possible to utilise a single motor with the various driven parts interconnected by gearing or other drive linkage. Alternatively more than three motors could be employed.

We claim:
1. A pipetting apparatus comprising:
a base,
a carriage mounted on said base and arranged to support a plurality of receptacles in a horizontal rectangular array of parallel rows extending across the carriage,
a nozzle support mounted on said base above said array,
first and second nozzle arms and first and second nozzles mounted respectively on said nozzle arms, each said nozzle arm being mounted on said nozzle support for movement between an upper position clear of said array and a lower position to carry the nozzle thereon into a receptacle in said array,
means for achieving relative movement between said carriage and said nozzle support to traverse said nozzles along adjacent rows of said array,
means for moving said first nozzle arm from said upper position to said lower position at each point in said traverse corresponding to a receptacle in the respective one of said adjacent rows, said second nozzle arm being arranged to engage with said first nozzle arm to be vertically supported thereby and follow said first nozzle arm from said upper to said lower position,
and means for retaining said second nozzle arm in said upper position at selected ones of said points in said traverse.

2. A pipetting apparatus comprising:
a base,
a carriage mounted on said base and arranged to support a plurality of receptacles in a horizontal rectangular array of parallel rows extending across the carriage, a nozzle support mounted on said base above said array, a nozzle arm and a nozzle mounted thereon, said nozzle arm being mounted on said nozzle support for movement between an upper position clear of said array and a lower position to carry said nozzle into a receptacle in said array, and for pivotal movement about a generally vertical axis to carry said nozzle between a first position above one said row of the array and a second position above an adjacent row of said array, means for achieving relative movement between said carriage and said nozzle support to traverse said nozzle along said one row, means for moving said nozzle arm from said upper to said lower position at each point in said traverse corresponding to a receptacle in said one row, and means for pivoting said nozzle arm from said first position to said second position at selected ones of said points in said traverse.

3. A pipetting apparatus as claimed in claim 1, wherein said nozzle support is provided with a parallelogram linkage associated with each of said first and second nozzle arms, each said linkage comprising two generally horizontal bars each pivotally mounted on said nozzle support, and a generally vertical link pivotally mounted between the ends of said bars remote from said nozzle support, the respective nozzle arms being mounted on said vertical links.

4. A pipetting apparatus as claimed in claim 1, comprising a third nozzle arm and a third nozzle mounted thereon, said third nozzle arm being mounted on said nozzle support for movement between an upper position clear of said array and a lower position to carry said third nozzle into a receptacle in said array, and for pivotal movement about a generally vertical axis to carry said nozzle between a first position above a first one of said adjacent rows of the array and a second position above the second of said adjacent rows.

5. A pipetting apparatus as claimed in claim 3, comprising a third nozzle arm and a third nozzle mounted thereon, said third nozzle arm being mounted on the vertical link of the linkage associated with said first nozzle arm for pivotal movement about a generally vertical axis, to carry said third nozzle between a first position above a first one of said adjacent rows of the array and a second position above the second of said adjacent rows.

6. A pipetting apparatus as claimed in claim 5, wherein said third nozzle arm is resiliently biased about said vertical axis towards said first nozzle arm and includes a cam follower roller mounted thereon, and including an inclined cam surface mounted on the vertical link of the linkage associated with said second nozzle arm, said inclined cam being arranged to engage said cam follower roller whereby said second nozzle arm may be supported from said first nozzle arm and said third nozzle arm is moved against said bias to said second position thereof.

7. A pipetting apparatus as claimed in claim 1, wherein said carriage is mounted on said base for linear movement in a first direction transverse to the rows of said array, and said nozzle support is mounted on said base for movement in a second direction along the rows of said array.

8. A pipetting apparatus as claimed in claim 7, including first drive means arranged to move said carriage in said first direction continuously, positioning means on said base arranged to carry said nozzle support and second drive means to move said positioning means step by step in said second direction, said steps corresponding to the positions of receptacles along the rows of said array, said second direction being at an acute angle to said first direction.

9. A pipetting apparatus as claimed in claim 8, wherein said first drive means includes a resilient bias operative on said carriage and a driven drum having a cable wound thereon and attached to said carriage whereby rotation of said drum may move the carriage against said bias.

10. A pipetting apparatus as claimed in claim 8, wherein said second drive means comprises a leadscrew mounted in said base at said acute angle to said first direction.

11. A pipetting apparatus as claimed in claim 1, wherein said carriage includes a water bath incorporating water heating and water circulating means.

12. Apparatus according to claim 1, comprising two nesting trays for the receptacles each tray having a tray frame for receiving at least one pair of removable receptacle racks.

13. Apparatus according to claim 1, comprising two nesting trays for the receptacles each tray having a tray frame for receiving at least one pair of removable nestable racks, a first rack of each pair having at least one apertured receptacle receiving bar and a second rack of each pair having one more apertured receptacle bar than the first rack the bars of the second rack being spaced apart to accommodate receptacles carried by the first rack when the latter is nested on the second rack, locating means acting between the tray frame and each rack at a different position on each rack to ensure that the racks of each frame can be disposed therein only in a single order and with a single orientation and the racks being spaced apart in their tray frame to permit the receptacles carried in the racks of a similar tray frame to be nested therebetween.

14. Apparatus according to claim 13, comprising a centrifuge block for accommodating the receptacles of a pair of nested racks.

15. Apparatus according to claim 13, in which the bars of all the racks are formed with a corresponding number of apertures extending from their upper to their lower faces to receive receptacles in the form of tubes, means being provided to hold the tubes resiliently against a corresponding part of the wall of each aperture and the bars of all the racks when mounted in their tray frame being similarly oriented.

16. Apparatus according to claim 1 including a measuring device operable to extract liquid from or dispense liquid into predetermined receptacles in said array by way of said nozzles, said measuring device comprising a replaceable unit mounted on said base and carrying a number of syringes together with a valve operable to provide a separate single pole changeover facility for at least some of the syringes to connect the latter selectively to a corresponding nozzle on the nozzle support and to a location external to the apparatus.

17. Apparatus according to claim 16, in which the unit comprises a base plate capable of being detachably secured externally of a casing for the apparatus with the head of each syringe piston rod engaging with a separate drive member thereto said drive members being coupled with a common reciprocating member carried at the end of a pivoted arm driven via a connecting rod from a cranked drive shaft rotated by said drive means, the pivoted arm being coupled with and operating the valve towards each end of its stroke.

18. Apparatus according to claim 17, comprising separate adjustable stops to limit the movement of the piston rods outwardly of their pistons and first lost motion means associated with each separate drive member for co-operation with the reciprocating member to permit a complete stroke of the latter in the sense to fill the syringes irrespective of the positions of said stops.

19. Apparatus according to claim 17, comprising separate adjustable stops to limit the movement of the piston rods outwardly of their pistons and first lost motion means carried by the reciprocating member to permit a complete stroke of the latter in the sense to fill the syringes irrespective of the positions of said stops.

20. Apparatus according to claim 17, comprising second lost motion means associated with the pivoted arm to permit the arm to pivot about the reciprocating member after the latter has completed its stroke in the sense to discharge the syringes.

21. Apparatus according to claim 17, in which the cranked drive shaft is connected via a two speed gearbox with a winch drum carrying a cord secured to the carriage.

22. Apparatus according to claim 7, wherein said means for selectively retaining said second nozzle arm in said upper position includes an abutment associated with said second nozzle arm and a castellated member mounted along said base in said second direction to selectively engage with said abutment.

References Cited
UNITED STATES PATENTS

| | | | |
|---|---|---|---|
| 2,624,656 | 1/1953 | Andrews et al. | 23—259 |
| 3,143,393 | 8/1964 | De Seguin Des Hons | 23—253 |
| 3,178,266 | 4/1965 | Anthon | 23—259X |
| 3,327,535 | 6/1967 | Sequeira | 23—259X |
| 3,413,097 | 11/1968 | Jungner | 23—253X |

MORRIS O. WOLK, Primary Examiner

R. E. SERWIN, Assistant Examiner

U.S. Cl. X.R.

23—253; 73—423; 141—130, 269